Jan. 19, 1937.  W. ELLIOTT  2,068,123
CLUTCH
Filed March 22, 1934  3 Sheets-Sheet 1
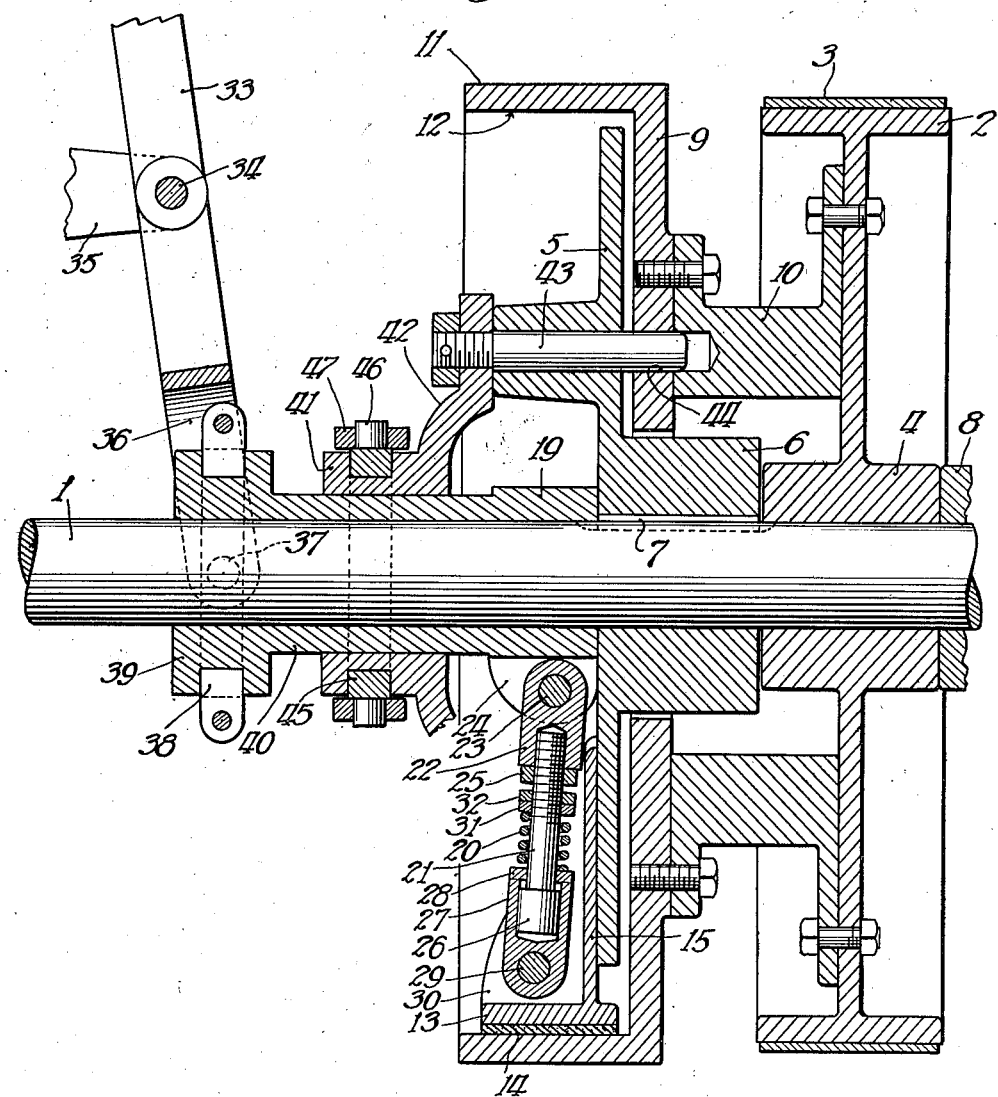
Inventor
William Elliott
By Osgood H. Dowell
Atty.

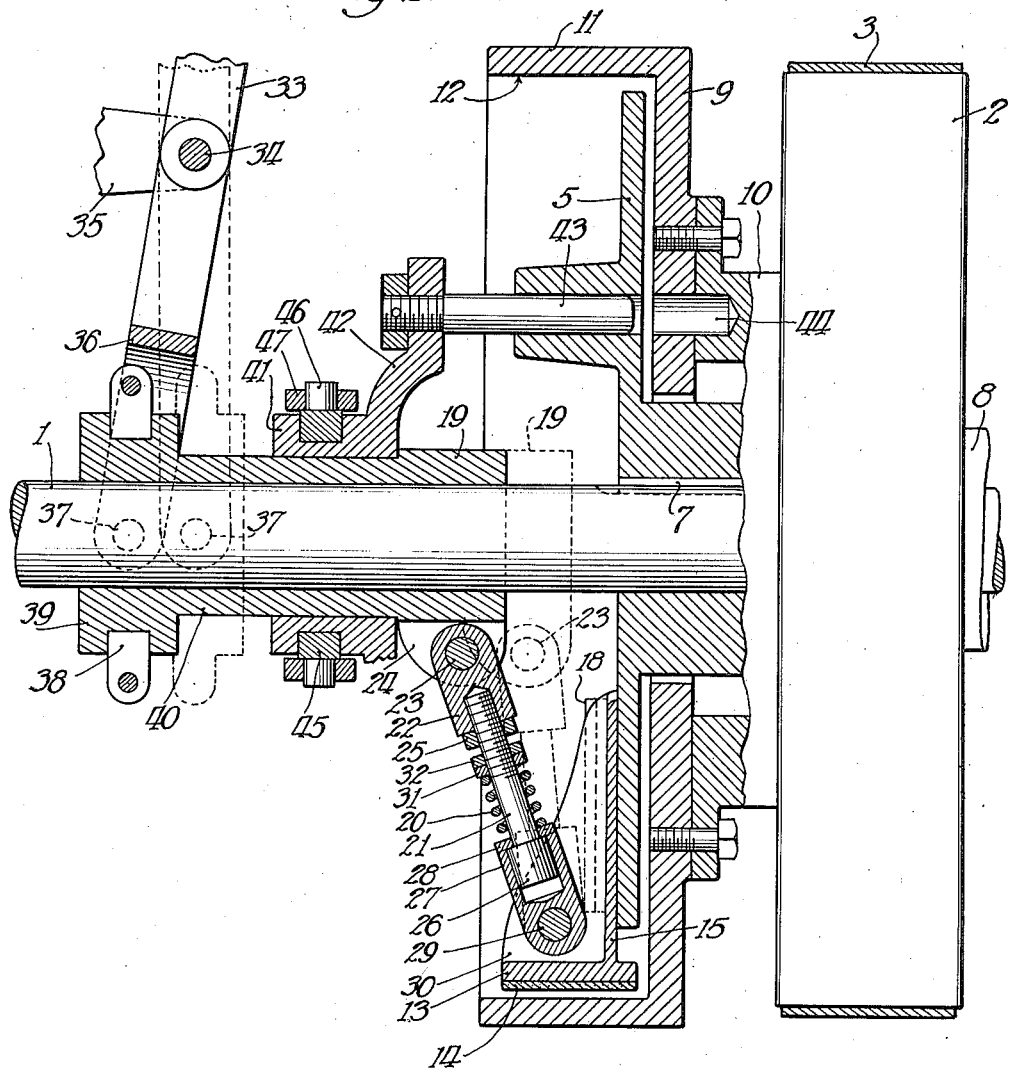

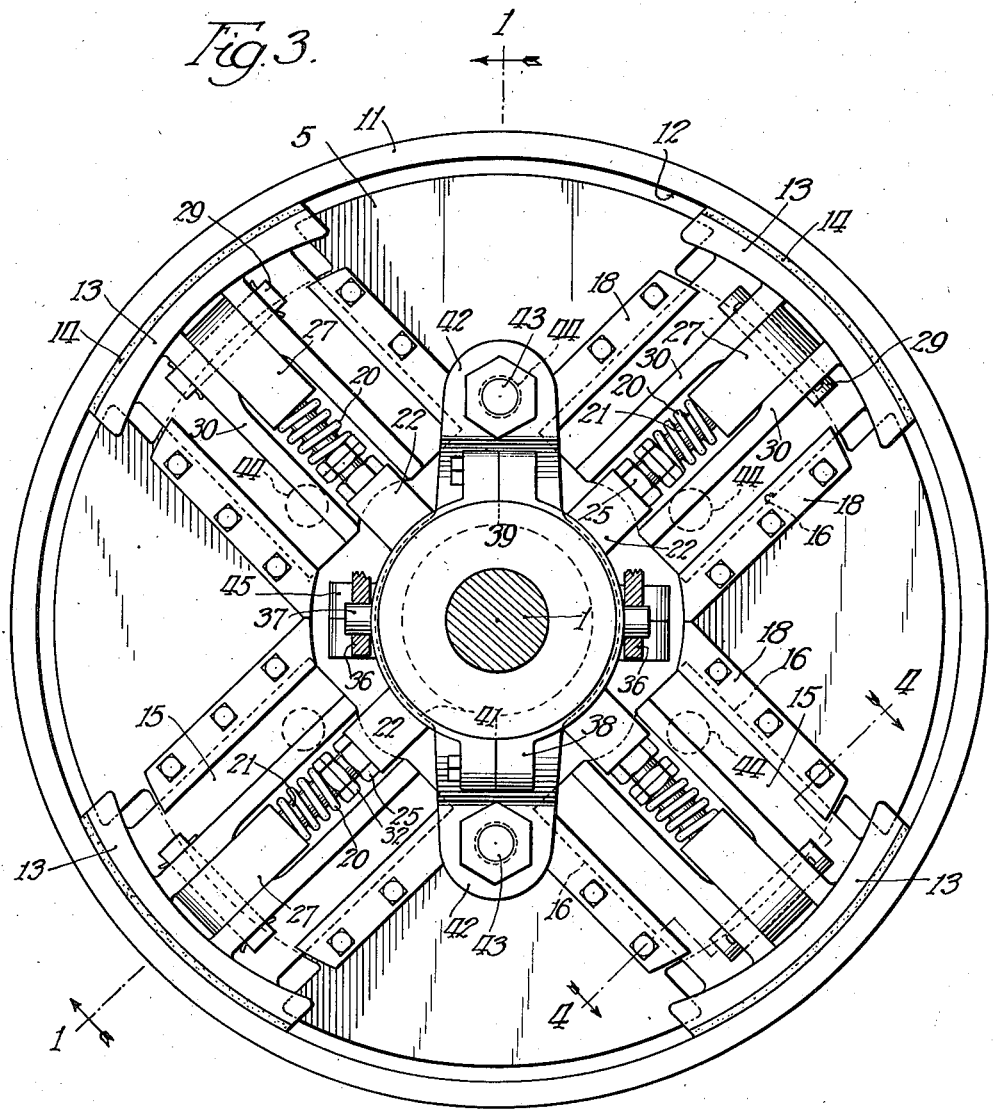

Patented Jan. 19, 1937

2,068,123

UNITED STATES PATENT OFFICE 2,068,123

CLUTCH

William Elliott, Elkhart, Ind., assignor to American Coating Mills, Elkhart, Ind., a corporation of Indiana Application March 22, 1934, Serial No. 716,761

2 Claims. (Cl. 192—53)

This invention relates to clutches.

The object of the invention is to provide a practicable and reliable clutch for obtaining a positive non-slip clutch drive connection between driving and driven elements.

In the driving of the press rolls, driers and calenders of paper making machines and paper board machines, it is highly important to avoid any possibility of slippage in the drive. The present invention contemplates the provision of a clutch suitable for the driving of such machinery or other machinery which must be driven without slippage, as well as the driving of heavy machinery or machinery operating against great resistance.

The invention will be described by reference to the accompanying drawings and will be particularly pointed out and defined in the claims following the description.

The drawings show as an illustrative example a clutch of one practicable construction embodying the invention, arranged in this instance for clutching a shaft to a driving pulley loosely mounted thereon.

Fig. 1 is a sectional view of the illustrative structure with the parts thereof in full clutched position, the section being taken on two planes intersecting at the center line of the shaft, namely on the two planes indicated by the angular section line 1—1 of Fig. 3, looking in the direction of the arrows.

Fig. 2 is a similar view with the parts in unclutched position, and indicating by dotted lines the first movement required to effect the clutching.

Fig. 3 is an end face elevation of the clutching mechanism as seen when looking from a position at the left of Fig. 1.

Fig. 4 is a detail section taken on the section line 4—4 of Fig. 3, looking in the direction of the arrows.

In the drawings, the numeral 1 denotes a shaft on which is a loose pulley 2. A driving belt engaging said pulley is indicated at 3 in Fig. 1.

Driving connection between the pulley and shaft is made through a two-fold clutching mechanism. Said clutching mechanism includes an expansible friction clutch means carried by the clutch carrier plate 5. Said carrier plate 5 is fast on the shaft, its hub 6 being in driving connection with the shaft through the key 7. The hub 4 of the pulley is shown arranged between the clutch hub 6 and a collar 8 affixed to the shaft, whereby the pulley is prevented from moving along the shaft.

The pulley is equipped with a bell 9 which in this instance is attached to the pulley by an annular carrying member 10 bolted to the web of the pulley and to the web of the bell. The flange 11 of the bell provides an internal annular friction surface 12 for engagement by expansible friction clutch means carried by the carrier plate.

Said friction clutch means is represented by a plurality of clutch shoes 13 faced with friction material 14. These clutch shoes are carried by slides 15 movable in radial guideways 16 on the clutch carrier plate 5. As shown in Fig. 4, the guideways may be provided by ribs 17 formed on the face of the carrier plate, and the slides carrying the clutch shoes may be retained in the guideways by the plates 18 attached to said ribs and overlying said slides.

The clutch shoes are operated by a toggle mechanism comprising a toggle hub or sleeve 19 slidable on the shaft and a plurality of toggle links or levers pivotally connecting said hub with the clutch shoes. The toggle links or levers are constructed as contractile struts embodying springs 20 through which the thrust is transmitted for forcing the clutch shoes into frictional engagement with the inner friction surface of the bell 9. The specific construction of the individual toggle links as shown in the drawings is as follows: Each toggle link comprises a screw rod 21 the threaded end portion of which is screwed into and adjustably secured to a member 22 pivoted on a pivot pin 23 between a pair of ears 24 on the hub 19. A lock nut 25 on the screw rod bears against the member 22 to secure the parts in adjusted relation. The head 26 of the screw rod is slidably fitted in a cylinder provided by a member 27 having an apertured end closure 28 surrounding said screw rod, which apertured end closure may be brazed to the member 27. Said member 27 is pivoted on a pivot pin 29 between a pair of ears 30 on the clutch shoe with which the toggle link is associated. The heavy coiled spring 20 surrounding the screw rod is arranged between the member 27 and an abutment nut 31 on the screw rod, said abutment nut being adjusted to place the spring under compression, and the adjustment being secured by the lock nut 32.

The above described construction permits forcing the toggle mechanism to a self-locked position with the clutch shoes gripping the friction surface 12 of the bell. As the toggle hub 19 is forced from the retracted or unclutching position shown in full lines in Fig. 2 to the dotted line position shown in said figure, the clutch shoes are forced outwardly against the bell with a powerful grip, due to the shortening of the distance between the centers of the pivots 23 and 29 and consequent increased compression of the powerful springs 20. From the said dotted line position the toggle hub can be forced further toward the pulley to carry the pivots 23 past the vertical plane of centers of the pivot pins 29, i. e. past a dead center position, thus locking the mechanism in clutching position. The screw rods 21 are so adjusted as to leave sufficient clearance between the screw heads 26 and outer ends of the cylinders to prevent jamming as the toggle links are operated past the dead center position.

In Figs. 1 and 2, the numeral 33 denotes a clutch shifting lever fulcrummed at 34 on a support 35. The shifting lever is formed with a yoke the arms 36 of which are pivotally connected to the diametrically opposite pivot pins 37 of a clutch collar 38 which is fitted in an annular groove on the head 39 of a sleeve 40 slidable on the shaft 1, said sleeve having the toggle hub 19 on its forward end. The friction clutch mechanism described is operated by shifting the lever 33, as is apparent.

Slidably mounted on the sleeve 40 is a hub or member 41 having arms 42 to which are attached driving pins 43 arranged parallel with the shaft. These driving pins are slidably fitted in holes extending through the clutch carrier plate 5 and are adapted to enter holes 44 formed in the bell and its carrying member, whereby to establish a positive drive connection between the members 5 and 9, in addition to the driving connection established through the friction clutch. Either one or two or more driving pins may be employed to establish the positive drive connection, according to the load and other conditions.

The hub or member 41 has an annular groove engaged by a clutch collar 45 having diametrically opposite pintles 46 engaged by the yoke arms 47 of a second shifting lever (not shown), whereby the member 41 can be operated to advance or retract the driving pins 43.

For convenience of illustration the two yokes 36 and 47 of the two clutch shifting levers are represented as arranged at right angles to each other, although in practice the two shifting levers may be arranged one in front of the other so as to operate in the same plane, in which case the two yokes and clutch collars would be in corresponding positions instead of the different positions shown.

In operation, the shift lever 33 is operated to move the sleeve 40 from the retracted or unclutched position shown in full lines in Fig. 2 to the position indicated by dotted lines in said figure, thus forcing the clutch shoes 13 into gripping engagement with the bell 9, and thereby coupling the driving pulley 2 to the shaft. The operator then presses on the second shift lever (not shown) in a direction to force the driving pins 43 against the bell, and simultaneously the operator moves the first shift lever in a direction to release the friction clutch somewhat and thus allow slippage between the bell and clutch shoes, with the result that the holes 44 will come into register with the driving pins, whereupon the driving pins will enter said holes 44 and thus connect the two parts 9 and 5. Then the operator works the shift lever 33 to force the friction clutch mechanism to the position shown in Fig. 1, in which position the friction shoes are locked in gripping engagement with the bell, the pivot pins 23 having been shoved past the dead center line. The driving and driven elements of the structure 1 are thus connected both by the powerful friction clutch means and the positive driving pin connection, so that there is no possibility of slippage in the drive. To unclutch, the operator by means of the unseen shift lever retracts the driving pins from the holes 44, and then by means of the shift lever 33 retracts the toggle mechanism to the position shown in Fig. 2, thus releasing the friction clutch.

The illustrative structure may be variously modified in details of construction and arrangement, and the invention as herein claimed may be embodied in various different structures to suit different requirements and conditions.

What I claim as my invention, and desire to secure by Letters Patent, is:

1. A clutch mechanism comprising co-axial driving and driven members, expansible friction clutch means carried by one of said members for engagement with the other, a positive drive connection between said members comprising driving pins slidably mounted in the same member which carries said clutch means and engageable in holes therefor in the other member, toggle mechanism for operating said friction clutch means comprising a shiftable shaft sleeve and toggle links connecting said sleeve and clutch means, said toggle links comprising contractile struts embodying springs through which the thrust is transmitted for forcing said friction clutch means against said other member, the arrangement permitting operating the toggle mechanism to a self-locked position with the friction clutch means gripping said other member, a shiftable element slidably and rotatably mounted on said sleeve for shifting said pins to engage and disengage said other member, and independent shift levers for said sleeve and element thereon.

2. A clutch mechanism comprising a shaft, a pulley or other member loose on the shaft, a bell carried by said pulley, a clutch carrier plate mounted on the shaft in driving connection therewith, expansible friction clutch means carried by said carrier plate for engagement with said bell, toggle mechanism for operating said friction clutch means, said toggle mechanism comprising a sleeve slidable on the shaft and toggle links pivotally connecting said sleeve and clutch means, said links comprising contractile struts embodying springs through which the thrust is transmitted for forcing said friction clutch means against the bell, the arrangement permitting operating the toggle mechanism to a self-locked position with the friction clutch means gripping the bell, means for effecting a positive drive connection between said carrier plate and bell comprising driving pins slidably mounted on said carrier plate and engageable in holes therefor in the bell, an element for shifting said pins slidably and rotatably mounted on said sleeve, and independent shift levers for said sleeve and element thereon.

WILLIAM ELLIOTT.